(12) United States Patent
Wu

(10) Patent No.: US 7,373,037 B2
(45) Date of Patent: May 13, 2008

(54) COMPACT WAVELENGTH-SELECTIVE OPTICAL CROSSCONNECT

(75) Inventor: Ming-Chiang Wu, Moraga, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 11/514,674

(22) Filed: Aug. 31, 2006

(65) Prior Publication Data

US 2008/0080810 A1    Apr. 3, 2008

Related U.S. Application Data

(63) Continuation of application No. 11/053,048, filed on Feb. 7, 2005, now Pat. No. 7,212,703, which is a continuation of application No. PCT/US03/25491, filed on Aug. 13, 2003.

(60) Provisional application No. 60/403,588, filed on Aug. 13, 2002.

(51) Int. Cl.
*G02B 6/26* (2006.01)
(52) U.S. Cl. .......................................... 385/16; 385/18
(58) Field of Classification Search ............ 385/16–18, 385/24
See application file for complete search history.

(56) References Cited

U.S. PATENT DOCUMENTS

| | | | |
|---|---|---|---|
| 5,009,477 A | 4/1991 | Alferness et al. | |
| 5,671,304 A | 9/1997 | Duguay | |
| 5,959,749 A | 9/1999 | Danagher et al. | |
| 6,055,349 A | 4/2000 | Seino et al. | |
| 6,097,859 A * | 8/2000 | Solgaard et al. | 385/17 |
| 6,154,583 A | 11/2000 | Kuroyanagi et al. | |
| 6,192,172 B1 | 2/2001 | Fatehi et al. | |
| 6,496,289 B1 | 12/2002 | Kuroyanagi et al. | |
| 6,898,013 B2 * | 5/2005 | Hall | 359/618 |
| 7,110,671 B1 * | 9/2006 | Islam | 398/51 |
| 2002/0018263 A1 * | 2/2002 | Ge et al. | 359/128 |
| 2002/0057861 A1 * | 5/2002 | Ge et al. | 385/16 |
| 2002/0083195 A1 * | 6/2002 | Beshai et al. | 709/238 |
| 2002/0197000 A1 * | 12/2002 | Marom | 385/17 |
| 2003/0012482 A1 | 1/2003 | Levine et al. | |
| 2003/0016903 A1 * | 1/2003 | Chan et al. | 385/16 |
| 2003/0091267 A1 * | 5/2003 | Alvarez et al. | 385/16 |
| 2003/0118272 A1 | 6/2003 | Tsushima et al. | |
| 2006/0132899 A1 * | 6/2006 | Islam et al. | 359/321 |

FOREIGN PATENT DOCUMENTS

| | | |
|---|---|---|
| EP | 0457974 A1 | 11/1991 |
| JP | 08-298499 A | 11/1996 |
| JP | 2000-111963 A | 4/2000 |

* cited by examiner

*Primary Examiner*—Ellen E. Kim
(74) *Attorney, Agent, or Firm*—John P. O'Banion

(57) ABSTRACT

A system and method of optically routing wavelength channels from within a plurality of optical inputs to any of a plurality of optical outputs. An optical wavelength-selective cross connect (WSXC) switch is described with a first stage of wavelength division multiplexing (WDM) routers which support an optical input and a plurality of optical outputs, which are interconnected to a second stage of WDM routers having a plurality of optical inputs and an optical output. The wavelength channel is routed in two stages from one of the input stage routers to an output stage router for output. It should be appreciated that the WSXC switch of the invention can be utilized for passing optical signals in either direction. In a preferred implementation integrated circuit router chips are stacked into cubes to form the routers stages which are cross coupled using a twisted butt joint to form a WSXC switch.

20 Claims, 6 Drawing Sheets

COMPACT WAVELENGTH-SELECTIVE OPTICAL CROSSCONNECT

CROSS-REFERENCE TO RELATED APPLICATIONS

This application is a continuation of U.S. application Ser. No. 11/053,048, filed on Feb. 7, 2005 now U.S. Pat. No. 7,212,703, incorporated herein by reference in its entirety, which claims priority from, and is a 35 U.S.C. § 111(a) continuation of, PCT international application serial number PCT/US03/25491, filed on Aug. 13, 2003, which designates the U.S., incorporated herein by reference in its entirety, and which in turn claims priority from U.S. provisional application Ser. No. 60/403,588, filed on Aug. 13, 2002, incorporated herein by reference in its entirety.

STATEMENT REGARDING FEDERALLY SPONSORED RESEARCH OR DEVELOPMENT

This invention was made with Government support under Grant No. ARPA N571/02, awarded by the Defense Advanced Research Projects Agency (DARPA). The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to optical switching systems, and more particularly to an optical wavelength channel cross-connect switch.

2. Description of Related Art

Wavelength-division multiplexing (WDM) is an important technology for providing high speed optical communications. Wavelength-division multiplexing (WDM) is an approach that exploits the huge bandwidth of optical transmission by multiplexing a number of discrete frequencies over the same optical link. The optical transmission spectrum under WDM is carved up into a number of discrete non-overlapping wavelength (or frequency) bands. Each wavelength supports a single communication channel, which may be further divided, such as by time multiplexing to support the transmission of a number of data streams on the channel.

The progress of optical WDM networks has been rapid and all-optical cross-connect switching systems have been implemented which allow any wavelength channel on a group of input fibers to be routed to any channel on a group of output fibers. For example, consider the case of eight optical fiber inputs and eight optical fiber outputs, with each fiber supporting one hundred wavelength channels. Using an optical wavelength-selective cross connect (WSXC) up to eight hundred channels are cross connected for output on the eight output fibers.

One form of all-optical wavelength-selective cross connect (WSXC) employs two-dimensional arrays of two-axis beam steering mirrors. These so-called 3D mirror arrays are typically fabricated utilizing micro-electromechanical systems (MEMS) techniques. The mirror arrays route a signal from a particular optical input to a desired optical output as selected on a two-dimensional grid. These cross-connect switches have a complicated structure requiring sophisticated control electronics, and they suffer from high power consumption.

Another approach to creating an all-optical cross-connect switch is based on demultiplexing the input, then using a cross-connect switch for each wavelength, after which the wavelengths are multiplexed back onto the output fibers. The approach is shown in FIG. 1, with wavelengths from a set of input fibers being separated into individual wavelength bands with a demultiplexer. A switching function is then performed on the individual wavelengths wherein an N×N switching matrix (8×8) is utilized to route signals to different multiplexers for combining the wavelengths into the set of output fibers. To support a configuration having eight input and output fibers, each supporting one hundred wavelengths, a total of 16 wavelength division multiplexers/demultiplexers are required, with 100 8×8 switches (one for each wavelength) along with 1600 fiber interconnections. It can be seen that wavelength selective cross-connects as currently embodied are complex and expensive to implement.

Therefore, a need exists for an all-optical cross-connect switch that allows cross connecting any of a plurality of wavelength channels from a group of optical fiber inputs to a group of optical fiber outputs. The present invention satisfies those needs, as well as others, and overcomes the deficiencies of previously developed wavelength selective optical cross-connect systems.

BRIEF SUMMARY OF THE INVENTION

The present invention pertains to a wavelength-selectable cross-connect (WSXC) switch that can be readily implemented in a cost-effective manner. The WSXC according to the invention utilizes two stages of wavelength division multiplexer (WDM) routers, which are also generally referred to as multi-port optical add-drop multiplexers.

The system and method of the invention can be practiced in a number of alternative ways. A first embodiment is described at the module level wherein individual WDM routers are interconnected by fibers. A preferred second implementation eliminates the need for fiber interconnections within a "chip level" implementation (i.e. utilizing single axis MEMs mirror technology) wherein the WDM router integrates all WDM functions, and a plurality of the optical routers are stacked and joined into multi-router cubes, preferably forming an input or an output stage. By way of example, two router cubes can be bonded back-to-back with one cube rotated by ninety degrees to form a compact and complete WSXC switch unit wherein the waveguides are optically cross-connected coupled between the first and second stage of routers allowing any wavelength on any input fiber to the first stage to be routed for output from any output fiber on the second stage of routers.

The method of coupling the optical stages in a back-to-back cross connected configuration may be practiced with the WSXC switch described herein and may also be practiced with other integrated optical systems.

The invention may be described as an apparatus for optically switching wavelength channels from within a plurality of optical inputs into any of a plurality of optical outputs and comprising: (a) a first plurality (stage) of optical wavelength division multiplexing (WDM) routers, each of which receives an optical input and which is configured to route individual wavelength channels therein for output on one of a plurality of optical outputs; (b) a second plurality (stage) of optical wavelength division multiplexing (WDM) routers, each of which has a plurality of optical inputs and is configured for routing individual wavelength channels therein for output on an optical output; and (c) means for interconnecting each of the plurality of optical outputs from the first stage to each of the optical inputs on the second stage. The interconnection means may be implemented in a number of alternative ways, for example by utilizing optical fiber connections or by directly coupling optical interfaces on the first and second stages.

The invention may also be described as a method of optically switching wavelength channels from within a plurality of input channels to any of a plurality of output channels comprising: (a) receiving optical signals at each of N optical routers in a first stage of optical routers; (b) routing separate wavelength channels received at the optical routers to selected one of N optical outputs; (c) interconnecting the N optical outputs of the first stage to N optical inputs at each of N optical routers in a second stage; and (d) routing separate wavelength channels received at the N optical inputs of each optical router of the second stage to an optical output of the optical router.

An integrated optical switch solution according to the invention may be described as an apparatus for optically switching wavelength channels, comprising: (a) a first routing stage wherein a plurality of optical routers integrated on substrates are stacked together; (b) a second routing stage wherein a plurality of optical routers integrated on substrates are stacked together; and (c) a cross coupled optical connection between the first and second routing stage, wherein the stack of integrated optical routers for the first and the second stages are joined. The wavelength channels from a given optical router within the first routing stage are optically coupled to each optical router within the second routing stage.

Each of the stacked integrated circuits is preferably implemented on a substrate comprising: (a) optical waveguides for each wavelength channel; (b) at least one dispersive element; (c) a slab waveguide; and (d) a focusing lens configured to direct wavelengths to and from a one axis array of micromirrors for switching wavelength channels between an optical input and a plurality of optical outputs. It will be noted that in the second stage the wavelength channels are switched between a plurality of optical inputs and an output channel. An array of single axis micromirrors is preferably joined to the substrates after stacking, wherein a single array of micromirrors can provide single axis wavelength steering for each WDM router.

The optical cross-connecting methods according to an aspect of the invention can be applied to a number of different optical systems and may be described as a method of interconnecting two-dimensional arrays of optical waveguides in a cross-coupled configuration, comprising: (a) stacking a first plurality of optical substrates, each having a plurality of waveguide optical connections; (b) stacking a second plurality of optical substrates, each having a plurality of waveguide optical connections, wherein when joined in the stacked configuration a two dimensional array of waveguide optical connections is created on an optical interface; (d) rotating the two interfaces; and (e) joining the stack of the first plurality of optical substrates to the stack of the second plurality of optical substrates forming a cross-connected set of interconnects. This form of integrated interconnect eliminates the need of interconnecting individual fibers between the first and second stages. It will be appreciated that the technique may be practiced with substrates and optical stages of stacked optical substrates that perform different optical functionality, without departing from the teachings of the present invention.

It should be appreciated that a means must be provided for matching the spacing between waveguides on a single substrate with the spacing between waveguides (at same wavelength channel position) on sequential substrates within the stack of substrates. The means of spacing may comprise adding a spacer to each substrate.

The cross-coupled interconnection provided by the above method allows connecting an array of optical interconnections from a single substrate within a first stage of optical devices to a given waveguide position across each of the substrates within a second stage of devices. The waveguide optical connections in a first stack of substrates W may be described by a regular two dimensional waveguide array given by $W_{0,a}, W_{0,b}, W_{0,c}, \ldots W_{0,n}$
$W_{1,a}, W_{1,b}, W_{1,c}, \ldots W_{1,n}$
$W_{2,a}, W_{2,b}, W_{2,c}, \ldots W_{2,n}$
$\ldots$
$W_{n,a}, W_{n,b}, W_{n,c}, \ldots W_{n,n}$ The subscripts a, b, c, . . . n denote the individual waveguide optical connections on a single substrate, and in which subscripts 0, 1, 2, 3, . . . n denote each optical substrate in the stack of the plurality of optical substrates. These are coupled after rotation to a second stack of substrates Y, the interconnections being described by:

$W_{0,a}\text{-}Y_{0,n}, W_{0,b}\text{-}Y_{1,n}, W_{0,c}\text{-}Y_{2,n}, \ldots W_{0,n}\text{-}Y_{n,n}$
$W_{1,a}\text{-}Y_{0,n-1}, W_{1,b}\text{-}Y_{1,n-1}, W_{1,c}\text{-}Y_{2,n-1}, \ldots W_{1,n}\text{-}Y_{n,n-1}$
$W_{2,a}\text{-}Y_{0,n-2}, W_{2,b}\text{-}Y_{1,n-2}, W_{2,c}\text{-}Y_{2,n-2}, \ldots W_{2,n}\text{-}Y_{n,n-2}$
$\ldots$
$W_{n,a}\text{-}Y_{0,a} W_{n,b}\text{-}Y_{1,a}, W_{n,c}\text{-}Y_{2,a}, \ldots W_{n,n}\text{-}Y_{n,a}$ The "-" symbol used above representing a connection between waveguides in the n×n array of waveguides. It should be appreciated that the relative rotation between the waveguide arrays prior to coupling them together is dependent on the configuration. In the example described the array comprises rows and columns perpendicular to one another, wherein the rotation may be 90 degrees to either the clockwise or counterclockwise direction. The cross-coupling aspect of the present invention may be utilized with a variety of integrated optical devices, the practice not being limited to the exemplified WSXC switch implementation.

The invention can significantly reduce the size and complexity of implementing WSXC switching solutions, and the technology may be utilized in other cross-connecting applications. Control of the MEMS mirrors is much simplified in the present invention because it requires only one-dimensional mirror position control. In the case of eight optical fiber inputs and outputs supporting one hundred wavelength channels each, the WSXC can be implemented with 16 WDM routers and 64 fiber interconnections. The use of a fiber interconnection matrix may then be eliminated by adopting a chip-level approach described herein to produce a single-cube optical cross-connect (OXC). The invention therefore, can greatly reduce the cost, size, and power consumption of wavelength selective cross-connect (WSXC) switches while increasing reliability.

An aspect of the invention describes cross connecting optical channels from a group of N input fibers to a group of N output fibers, without the need of separate N×N switches for each channel.

Another aspect of the invention describes cross connecting optical channels from a group of N input fibers to a group of N output fibers, without the need to control multi-axis mirror assemblies.

Another aspect of the invention describes cross connecting optical channels utilizing a plurality of identical WDM router modules, or circuits.

Another aspect of the invention describes integrating WDM router functionality with OXC functions to create an optical WSXC switch without the necessity of utilizing separate optical fiber interconnections between the modules.

Another aspect of the invention is the creation of an optical WSXC switch having low complexity and low power consumption in relation to current optical WSXC switch implementations.

A still further aspect of the invention is a method of cross-connecting two dimensional optical connector arrays as may be embodied on stacks of integrated circuit optical devices.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 2 through FIG. 4E. It will be appreciated that the apparatus may vary as to configuration and as to details of the parts, and that the method may vary as to the specific steps and sequence, without departing from the basic concepts as disclosed herein.

The present invention pertains to an all optical wavelength selectable cross-connect switch (WSXC) utilizing a plurality, such as 2N, of interconnected WDM routers to support N input fibers and N output fibers. The invention can be practiced by interconnecting modules, or by integrating all WDM functionality into a into an integrated circuit chip that can be bonded with other chips into stacks are formed and interconnected and micro-mirror arrays are joined to form an optical WSXC switching cube.

Figure 1:
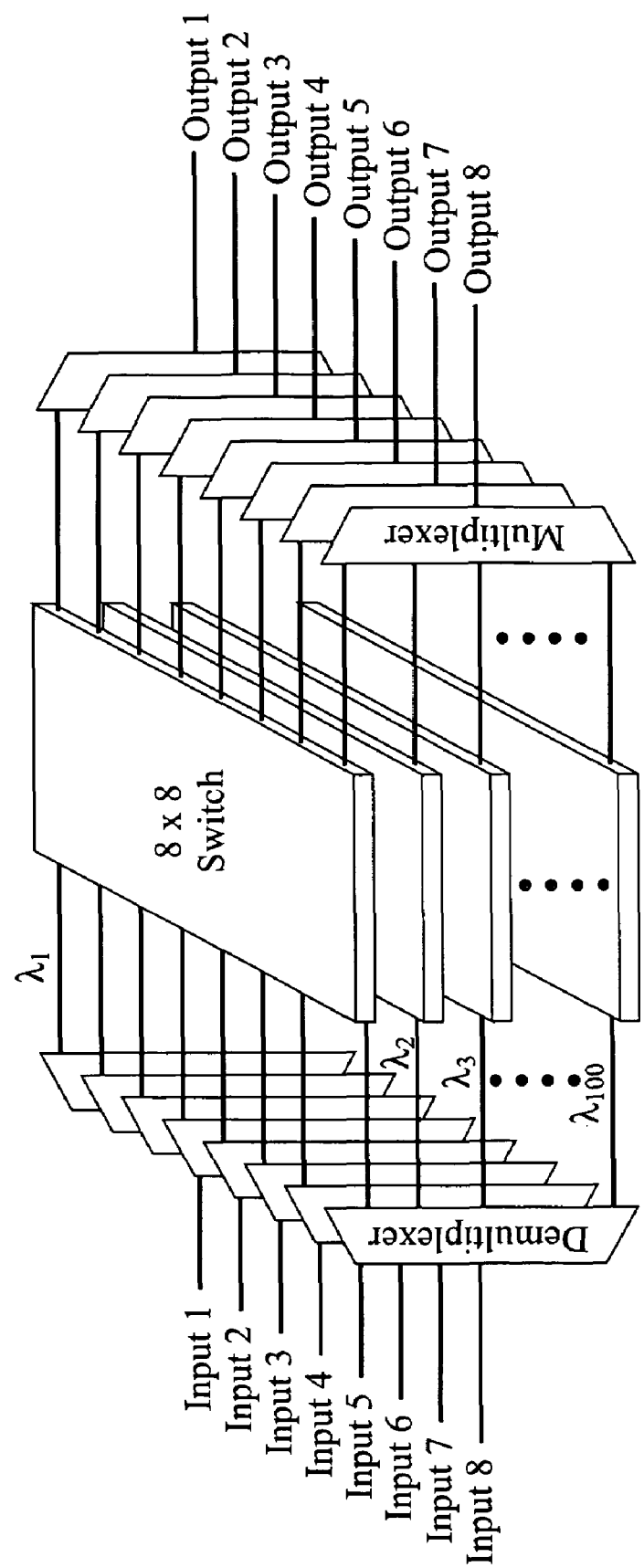
FIG. 1 is a block diagram of a conventional optical WSXC switch implementation utilizing N×N switch modules connected between a WDM demultiplexer and multiplexer.
Figure 2:
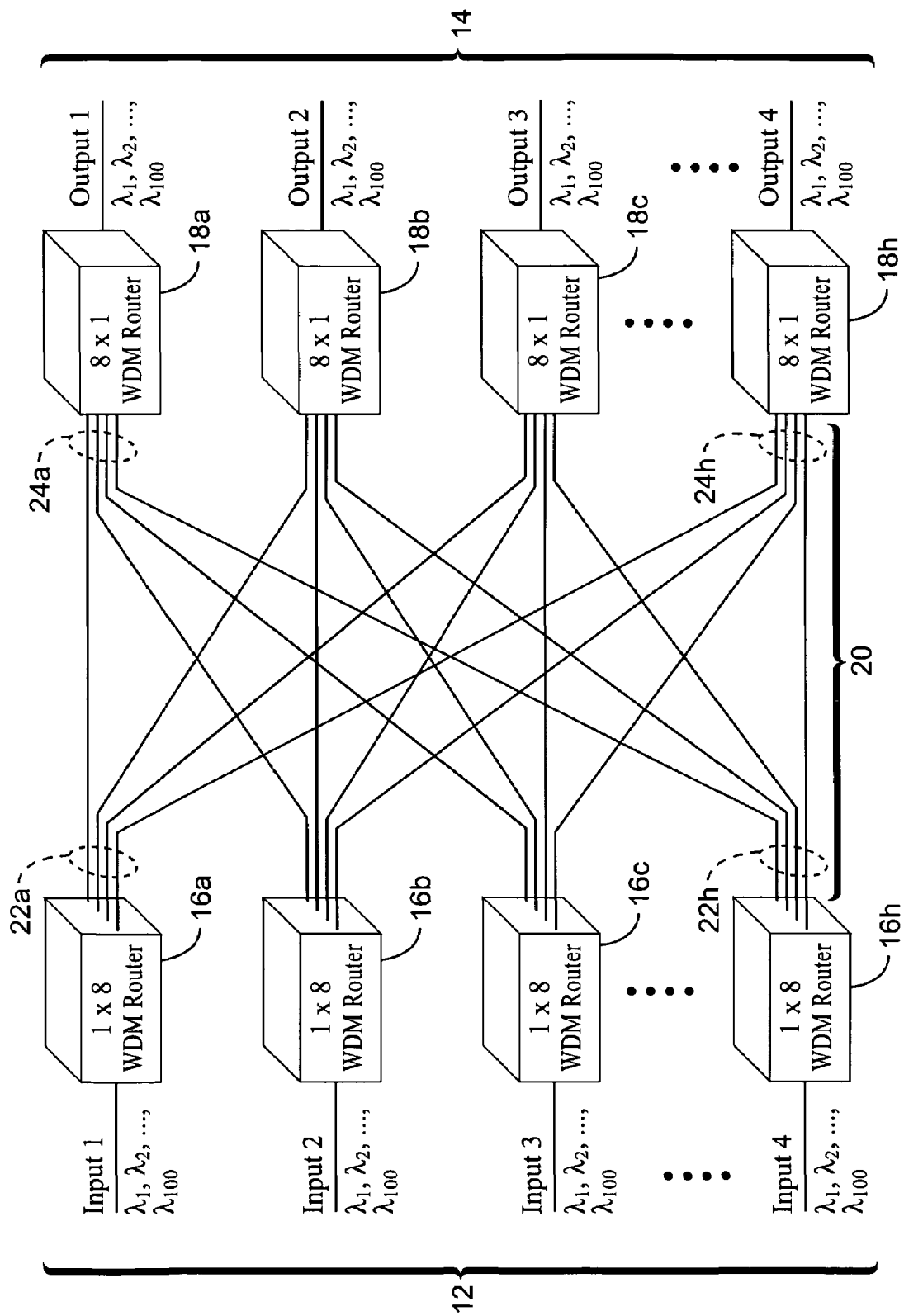
FIG. 2 is a block diagram of an optical WSXC switch utilizing a series of WDM routers according to an embodiment of the present invention, showing a substantial reduction in the need for intermediate fiber interconnections.

FIG. 2 illustrates by way of example an embodiment of a WSXC switch 10 having eight optical inputs 12, and eight optical outputs 14. These optical inputs and outputs preferably comprise optical fiber interconnections configured for receiving optical fibers, although other forms of optical interconnection may be alternatively utilized. The cross-connect is formed from sixteen 1×8 WDM routers arranged in a first stage of eight WDM routers 16a through 16h, which is interconnected to a second stage of eight WDM routers 18a through 18h. Fiber interconnections 20 are shown interconnecting each of the eight output fibers 22a through 22h on WDM routers 16a through 16h, to one of the eight input fibers 24a through 24h of each second stage WDM router 18a through 18h. It should be appreciated that the implementation can support a different number of fibers comprising inputs and outputs, along with the number of channels supported on each fiber. It should also be appreciated that although the WSXC switch is described as receiving inputs on the first stage and performing output from the second stage, it can be configured for routing wavelength channels in either or both directions.

The WDM router, also referred to as a wavelength selective switch (WSS), has recently been commercialized. The WSS generally consists of an array of input fiber collimators, a wavelength-dispersing grating, a focusing lens, and an array of analog micromirrors for switching the individual wavelengths from the input fiber to different output fibers. The number of the mirrors is equal to the number of wavelength channels in the input fiber.

The channel switching performed by the WDM routers is controlled by a means for modulating the routing within the first and second stage of routers, which is performed by a dedicated switching control circuit, or more preferably a switching program executing on a computer processor, such as an embedded controller, a routing processor for a network, or other processing device. It should be appreciated that this computer processor, or other form of routing control means, may be integrated within the WXSC switching unit, or provided separately. In a large routing application, one control circuit or computer processor would typically be configured for controlling a series of WSXC switches.

Circuits for controlling the operation of first stage and second stage routing can be implemented by one of ordinary skill in the art, based on the teachings of the present invention.

The computer processor is configured for receiving wavelength channel switching commands. The programming executable on the computer processor is configured for routing wavelength channels in a two-stage process with channels being routed from an input to one of a plurality of outputs (N) which are then routed within a second stage of routers. The programming carries out the operations of (a) mapping an optical transmission path from the optical inputs of the first stage of the wavelength division multiplexing routers to the optical output from the second stage of the WDM routers in response to the wavelength channel switching commands, (b) configuring the routing of the first and second stage routers in response to the optical transmission path mapping.

In operation, a desired optical channel within one of the input fibers of a set of first-level WDM routers is routed by one of the routers to a second-level WDM router whose output is connected to the fiber to which the channel is to be communicated. For example, wavelength $\lambda_{50}$ of the fiber input to WDM router 16a is output to a fiber output within 22a that is directed to the inputs 24h of second-level router 18h, wherein it is routed as wavelength $\lambda_{50}$ that is output from WDM router 18h. It will be recognized that in this all-optical cross-connect, the wavelength of each channel being routed remains the same as it passes through the system.

The WDM routers can be implemented by using conventional interference filters, gratings, or other means of separating the channel wavelengths contained on an optical fiber. The wavelengths may be separated to impinge across the set of mirrors within a single axis micromirror assembly (i.e. either directly or indirectly through an intermediate means of directing optical energy) wherein individual input wavelengths are directed to a selected fiber connected at the output.

The configuration shown in FIG. 2 illustrates the general construction for a modular wavelength-selectable cross connect switch, wherein the first and second stages of WDM routers are interconnected with optical fibers or similar elongated optical pathways. It should be recognized that this switch configuration can significantly reduce the number of interconnections necessary for implementing the optical WSXC switch. However, it will be appreciated that optical fiber interconnections are still necessary, which increase the cost and space necessary for implementation.

Figure 3:
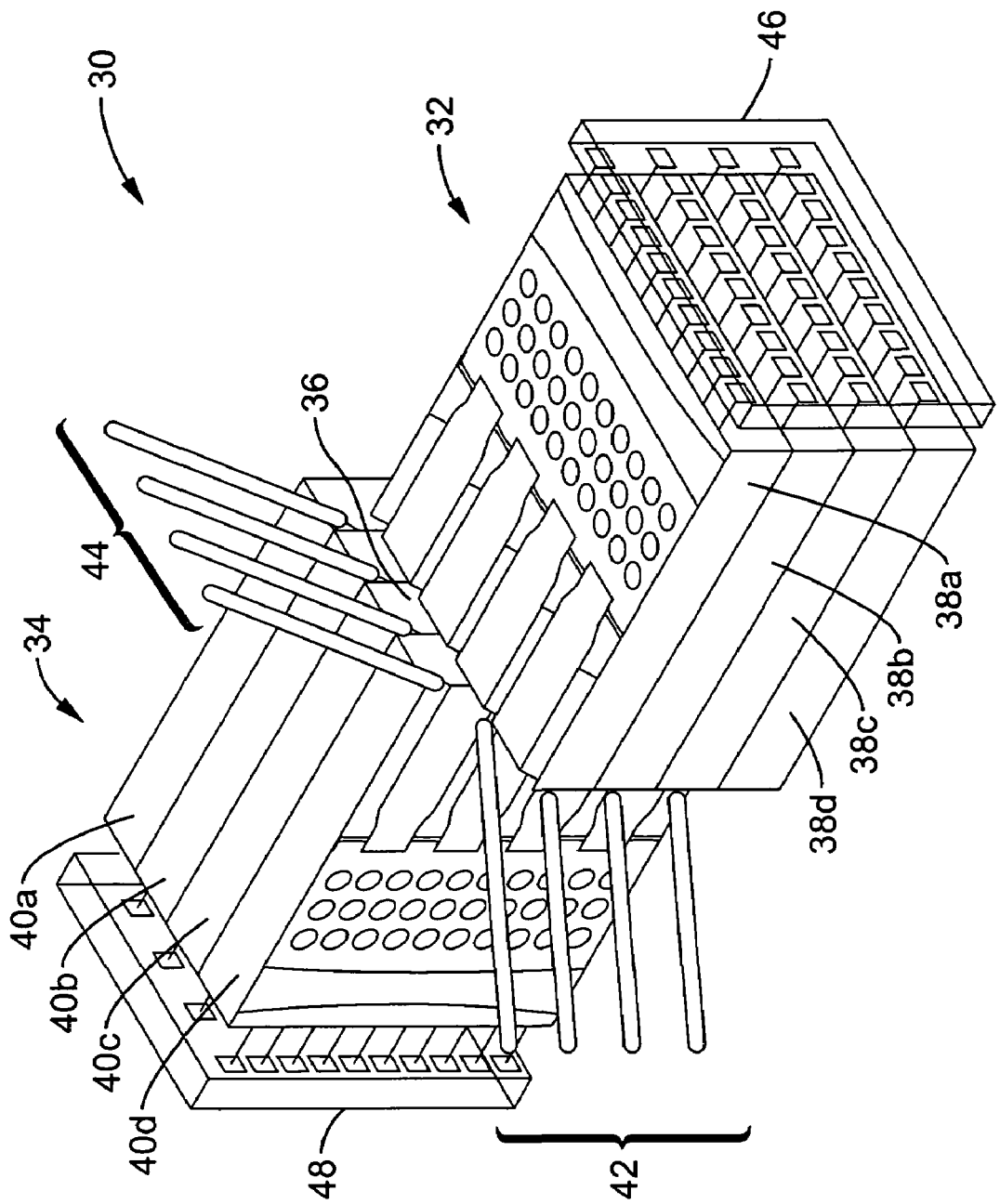
FIG. 3 is a perspective view of an assembled WSXC in a cube format assembled from integrated circuit router components and micromirror arrays according to an aspect of the present invention which eliminates the need for fiber interconnections.

FIG. 3 illustrates by way of example a preferred embodiment of an integrated WSXC switching cube 30 utilizing an input stack 32 (which forms an input cube) and output stack 34 (which forms an output cube) interconnected at their optical interfaces 36. The optical interfaces preferably comprise a plurality of waveguides configured for communicating optical channels to waveguides in another optical interface, such as between the first and second stage of integrated routers. For the sake of simplicity each stack (stage) of integrated WDM routers is shown limited to four interconnected monolithic WDM routers 38a through 38d, and 40a through 40d. Input fibers 42 connect into input cube 32 with output fibers 44 connecting to output cube 34. Micromirror arrays 46, 48 are coupled to each stage for directing channels to one of the outputs on input stack 32 or from one of the inputs on output stack 34. The micromirror arrays are preferably implemented as single axis mirror arrays that may be fabricated by any convenient technology such as analog micromirror arrays fabricated using MEMs techniques.

FIG. 4A through FIG. 4E illustrate by way of example the fabrication of a WSXC switch according to the present invention by stacking and interconnecting integrated WDM router chips and single axis micromirror arrays.

Figure 4B:
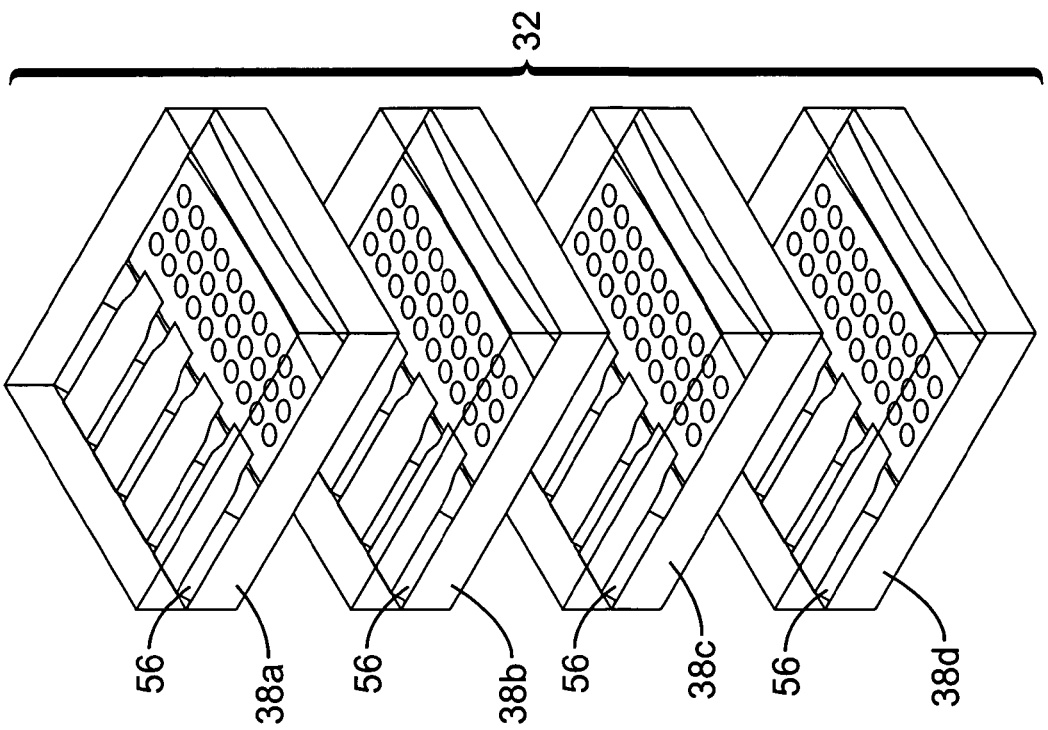
FIG. 4B is a perspective view of assembling a stack of integrated WDM routers as shown in FIG. 4A, according to an aspect of the present invention.
Figure 4A:
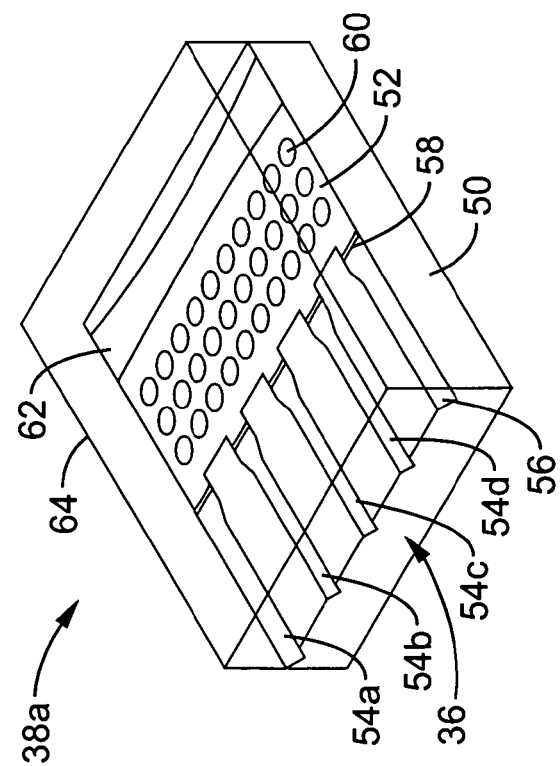
FIG. 4A is a perspective view of a portion of an integrated WDM router with a spacer configured according to an aspect of the present invention, shown during the fabrication process of a WSXC cube in FIG. 4A through FIG. 4E.

FIG. 4A illustrates creation of an integrated circuit WDM router 38a, which may be referred to herein as a "router chip", shown without an integrated micromirror array. All WDM router functionality may be integrated on the router chip to reduce the size of the cross-connect system while eliminating the need for fiber interconnections. Although all functions may be integrated within the router chip itself, the example depicts a preferred fabrication technique wherein a single two-dimensional micromirror array is aligned and coupled to the assembled router cube, which eliminates the need to fabricate a separate linear array of micromirrors for each substrate. The micromirror array shown comprises rows of single axis mirrors utilized for routing optical wavelengths within each router chip of the router cube. Router chip 38a is shown fabricated on a substrate 50 providing a slab waveguide 52.

An array of optical I/O (outputs on an input stack, or inputs on an output stack) 54a through 54d comprising optical waveguides (equivalent to fibers) are shown having a fixed pitch (spacing) at interface 36. Extending from one end of interface area 36 is a means for receiving an optical fiber, such as V-groove 56, which is optically coupled to a portion of substrate 50. Along the length of the waveguide are collimating lenses 58 (i.e. equivalent to the microlenses inside the fiber collimators), a dispersive element 60 shown as a Superprism™ (manufactured by NEC®) which provides similar functionality as a grating, a lens element 62 shown as a planar microlens 62. The output from lens element 62 is then directed to a linear MEMS analog micromirror array 46, 48, which is shown in FIG. 3 but which has not yet been connected in accord with FIG. 4A. A spacer 64 may be formed with or joined to substrate 50 to match the pitch of the optical I/O (i.e. 54a to 54b, 54b to 54c, etc.). The spacer matches the pitch between waveguides on stacked router chips to the pitch between waveguides on a single the integrated router chip. The chip-scale WDM router of FIG. 3 through FIG. 4E has many advantages over its free-space counterparts, including batch fabrication, reduction of size and weight, and eliminating the majority of the optical alignment and laborious manual assembly.

The focal lengths of the collimating microlens 58 are $f_1$ and $f_2$, respectively. The distance between the waveguides 54a-54d, 56, and collimating microlens 58 is $f_1$, while that between the collimating microlens 58 and the focusing microlens 62 is $f_1+f_2$, and that between the focusing microlens 62 and the MEMS mirrors 46, 48 is $f_2$. A dispersive element 60 is inserted between the collimating lenses 58 and focusing lens 62. Dispersive element 60 can be implemented by microfabricated gratings, prisms, photonic crystal Superprism™, or other known dispersive elements. Photonic crystal Superprism is a photonic crystal structure with unusually high dispersion (previously proposed by NEC®).

In waveguides 54a-54d, 56, light is confined in both lateral directions. Outside the waveguide is the slab waveguide 52, wherein light is still confined in the vertical direction, but not in the in-plane direction. The propagation of light in slab waveguide is similar to light propagation in free-space except it is confined within the slab. Light in the lateral direction can be shaped or redirected by lenses. Planar microlenses (or two-dimensional microlenses) are created by introducing different optical refractive indices between the lens region and the slab waveguide. For example, the present implementation preferably utilizes a silicon-on-insulator (SOI) wafer, with the top silicon layer providing the slab waveguides 54a-54d, 56. Microlenses 62 are realized by partially oxidizing the silicon within the lens area, which reduces the average refractive index in that region. There are other known techniques for making planar microlenses, for example, by depositing materials on top of the slab waveguide, or by change the refractive index selective by optical irradiation.

Using standardized spacing, the WDM router chips can be interconnected in different geometries, such as stacked into stages which are interconnected to form a multi-router cube. This is an important aspect of the WDM router integration within the present invention, for with the use of twist butt coupling on integrated routers the intermediate fiber interconnects can be eliminated as well as the associated assembly and alignment burdens.

Figure 4C:
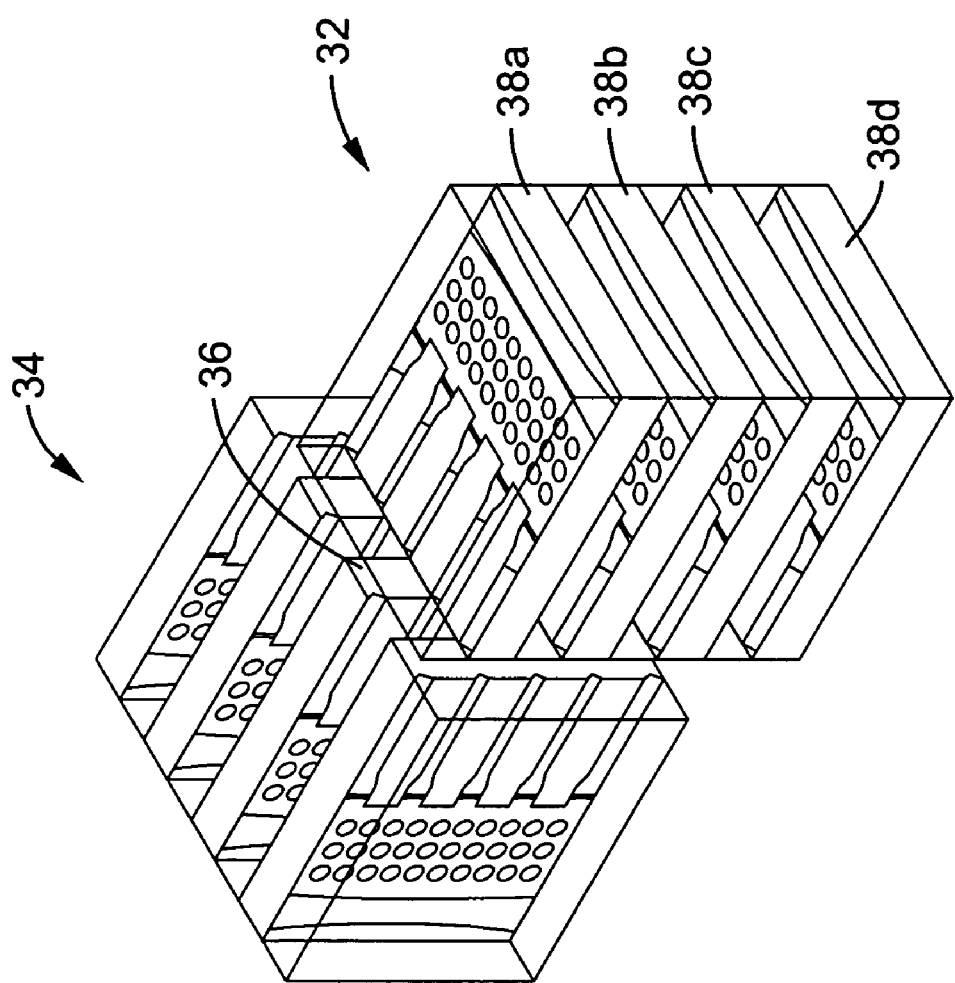
FIG. 4C is a perspective view of a twist-butt coupling of stacked integrated WDM routers shown in FIG. 4B, according to an aspect of the present invention.

FIG. 4B through FIG. 4E depict utilizing a plurality of router chips to construct an all optical WSXC switch. FIG. 4B depicts stacking four router chips 38a-38d into an input cube 32. FIG. 4C depicts a stack of router chips 38a-38d comprising N integrated 1×N WDM routers as a first stage 32, being coupled at interface 36 to a second stage 34 of router chips which has been rotated ninety degrees. The pitch of waveguides 54a-54d is set to match the pitch between each stacked router chip 38a-38d, wherein the waveguides are optically aligned and cross coupled between the first and second stage of routers.

Figure 4E:
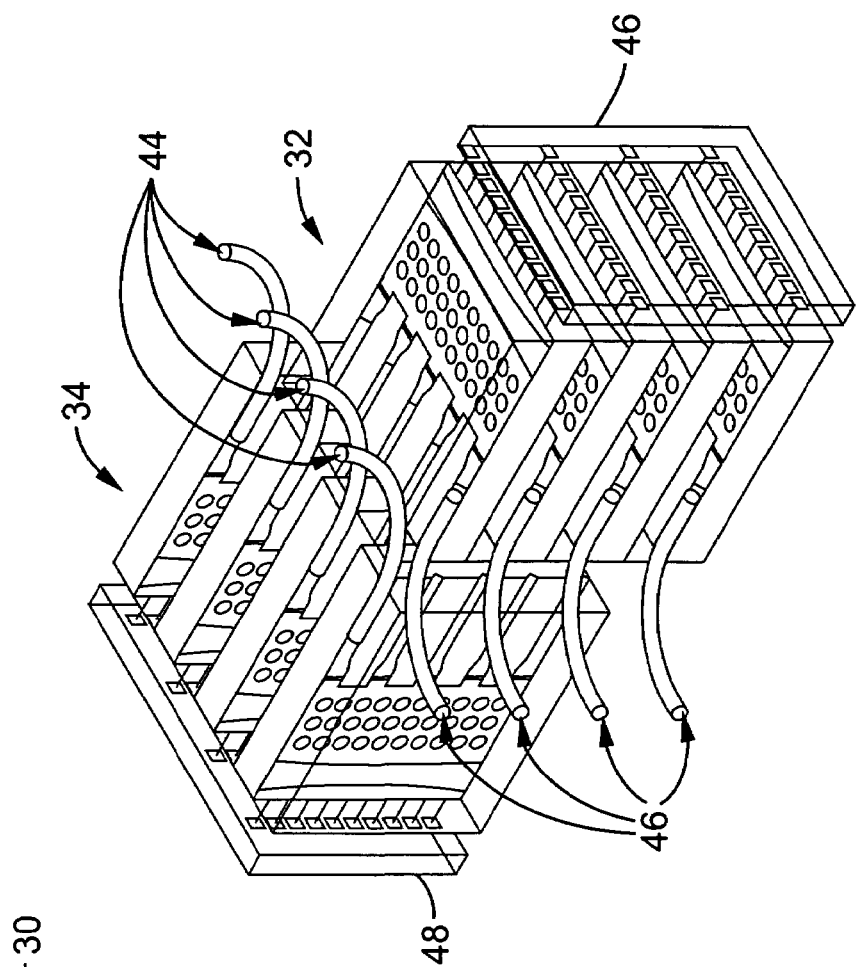
FIG. 4E is a perspective view of aligning and affixing micromirror arrays to the OXS blocks according to another aspect of the present invention.
Figure 4D:
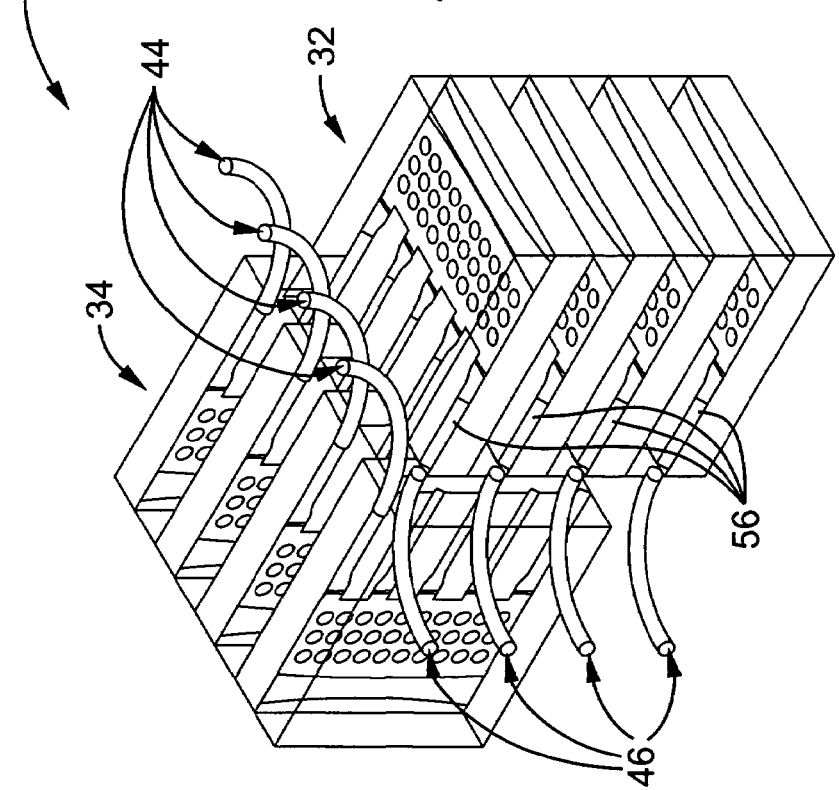
FIG. 4D is a perspective view of attaching input and output fibers to the OXS block of FIG. 4C, according to an aspect of the present invention.

This form of connection is generally a butt coupling with a preparatory twist, and is referred to herein as a "twist-butt" optical coupling. It should be noted that the N outputs from each first stage 32 is coupled to the N inputs of second stage 34. FIG. 4D depicts connecting input and output fibers, such as at V-grooves 56, to the physically and optically joined input and output cubes. In FIG. 4E separate micromirror arrays 46, 48 are coupled respectively to input cube 32 and output cube 34 to complete fabricating WSXC switch 30.

The invention significantly reduces the size and complexity of an all optical WSXC switch. Accurate micromirror array positioning is simplified within the invention since it requires only one-dimensional control. The single-cube OXC 30 shown comprising butt-coupled input cube 32 and output cube 34 also benefits from the elimination of fiber connections between the input and output stages. The invention therefore can significant reduce the cost, size, and power consumption of all-optical WSXC switching.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An optical switch, comprising:
a first plurality of optical wavelength division multiplexing (WDM) routers, each said router having at least one optical input and a plurality of optical outputs, each said router configured to receive an optical input signal and optically route individual wavelength channels in said optical signal to said optical outputs;
a second plurality of optical wavelength division multiplexing (WDM) routers, each said router having a plurality of optical inputs and at least one optical output, each said router configured to optically route individual wavelength channels received on said optical inputs to said optical output;
a plurality of single axis mirrors within each router of said first plurality of optical wavelength division multiplexing (WDM) routers and said first plurality of optical wavelength division multiplexing (WDM) routers;
said single axis mirrors configured for selecting wavelength channels and directing them between the optical inputs and outputs of said first and second plurality of optical wavelength division multiplexing (WDM) routers in response to the position of said single axis mirrors;
wherein accurate wavelength channel selection of said first and second optical wavelength division multiplexing (WDM) routers is enhanced as said single axis mirrors require only one-dimensional control;
a plurality of optical pathways interconnecting each of the plurality of optical outputs in said first plurality of routers to said optical inputs in said second plurality of routers, wherein the different optical outputs of a given router within said first plurality of optical wavelength division multiplexing (WDM) routers are optically coupled to different optical inputs on different routers within said second plurality of optical wavelength division multiplexing routers;
wherein said first and second plurality of optical wavelength division multiplexing (WDM) routers comprise all optical routers.

2. An optical switch as recited in claim 1, wherein said optical switch is configured for routing wavelength channels in either or both directions.

3. An optical switch as recited in claim 1, wherein said optical switch is configured for routing any wavelength on any input fiber of the first plurality of optical wavelength division multiplexing (WDM) routers to be routed for output from any output fiber on the second plurality of optical wavelength division multiplexing (WDM) routers.

4. An optical switch as recited in claim 1, wherein said means for interconnecting comprises optical fibers coupling each of said optical outputs from said first plurality of routers to each of said optical inputs on said second plurality of routers.

5. An optical switch as recited in claim 1:
wherein each router within the first or second plurality of optical wavelength division multiplexing (WDM) routers selects wavelength channels in response to the positioning of a single-axis mirror; and wherein the number of said single-axis mirrors is equal to the number of wavelength channels in the optical input of each router.

6. An optical switch as recited in claim 1, wherein each router within the first or second plurality of optical wavelength division multiplexing (WDM) routers, comprises:
optical waveguides for each wavelength channel;
at least one dispersive element;
a slab waveguide;
a single axis array of micromirrors; and
a focusing lens configured to direct wavelengths to and from said single axis array of micromirrors for switching wavelength channels between an optical input and a plurality of optical outputs, and/or between a plurality of optical inputs and an optical output.

7. An optical switch as recited in claim 6, wherein said dispersive element is selected from the group of dispersive elements consisting of microfabricated gratings, prisms, and photonic crystals.

8. An optical switch as recited in claim 1, wherein said optical inputs and said optical outputs comprise optical fiber connections.

9. An optical switch as recited in claim 1, further comprising means for modulating routing paths within said first plurality of routers and said second plurality of routers to direct specified wavelength channels from said optical inputs in said first plurality of routers for output from said second plurality of routers.

10. An optical switch as recited in claim 1:
wherein said first plurality of optical wavelength division multiplexing (WDM) routers comprises a first router stage;
wherein said second plurality of optical wavelength division multiplexing (WDM) routers comprises a second router stage; and
wherein each said optical wavelength division multiplexing (WDM) router within said first router stage has one optical input and N optical outputs, each said optical output being optically coupled to one of N optical inputs on each of N optical routers forming said second router stage.

11. An optical switch, comprising:
a first plurality of optical wavelength division multiplexing (WDM) routers, each said router having at least one optical input and a plurality of optical outputs, each said router configured to receive an optical input signal and optically route individual wavelength channels in said optical signal to said optical outputs;
a second plurality of optical wavelength division multiplexing (WDM) routers, each said router having a plurality of optical inputs and at least one optical output, each said router configured to optically route individual wavelengths received on said optical inputs into wavelength channels on said optical output;
a single axis mirror, in each said optical wavelength division multiplexing routers within said first and second plurality of optical wavelength division multiplexing routers, configured for selecting wavelength channels in response to the positioning of said single-axis mirror;
wherein said single axis mirror is configured for routing wavelength channels from said first to said second optical wavelength division multiplexing routers, and from said second to said first optical wavelength division multiplexing routers;
wherein accurate wavelength channel selection of said first and second optical wavelength division multiplexing (WDM) routers is enhanced as said single axis mirrors require only one-dimensional control;
wherein each said optical wavelength division multiplexing router comprises all optical routers in which the optical inputs remain in the optical domain throughout the optical switch and is output through optical outputs; and
means for interconnecting each of the plurality of optical outputs in said first plurality of routers to said optical inputs in said second plurality of routers so that any wavelength on any input fiber of the first plurality of optical wavelength division multiplexing (WDM) routers can be routed for output from any output fiber on the second plurality of optical wavelength division multiplexing (WDM) routers.

12. An optical switch as recited in claim 11, wherein said means for interconnecting comprises optical fibers coupling each of said optical outputs from said first plurality of routers to each of said optical inputs on said second plurality of routers.

13. An optical switch as recited in claim 11, wherein each router within the first or second plurality of optical wavelength division multiplexing (WDM) routers selects wavelength channels in response to the positioning of a single-axis mirror.

14. An optical switch as recited in claim 13, wherein each router within the first or second plurality of optical wavelength division multiplexing (WDM) routers, comprises:
optical waveguides for each wavelength channel;
at least one dispersive element;
a slab waveguide;
a single axis array of micromirrors; and
a focusing lens configured to direct wavelengths to and from said single axis array of micromirrors for switching wavelength channels between an optical input and a plurality of optical outputs, and/or between a plurality of optical inputs and an optical output.

15. An optical switch as recited in claim 14, wherein said dispersive element is selected from the group of dispersive elements consisting of microfabricated gratings, prisms, and photonic crystals.

16. An optical switch as recited in claim 11, wherein said optical inputs and said optical outputs comprise optical fiber connections.

17. A method of optically switching wavelength channels from within a plurality of input channels to any of a plurality of output channels, comprising:
receiving wavelength division multiplexed optical signals at each of N optical routers in a first router stage;
positioning a plurality of single axis mirrors in each said optical router for routing N separate wavelength channels received at each router of said N optical routers in said first router stage to an N×N output of said first stage;
optically interconnecting said N×N optical outputs of said first stage through optical pathways to N×N optical inputs of a second stage with N optical pathways connected to each of N optical routers in said second router stage; and
positioning a plurality of single axis mirrors in each said optical router for routing each of N separate inputs received at each router of said N optical routers into selected wavelength channels within each of N outputs from said second router stage;
wherein rows within the N×N optical outputs of said first router stage are interconnected with columns within the N×N optical inputs of said second router stage, and wherein columns within the N×N optical outputs of said first router stage are interconnected with rows within the N×N optical inputs of said second router stage;

wherein accurate wavelength channel selection during said routing is enhanced as said single axis mirrors require only one-dimensional control; and wherein any wavelength channel received at any of the N optical routers of said first router stage can be routed for output from any of the N optical routers within said second router stage.

18. A method as recited in claim 17, further comprising modulating routing paths within said first stage of routers and said second stage of routers to direct specified wavelength channels from said optical inputs in said first plurality of routers for output from said second plurality of routers.

19. A method as recited in claim 17, wherein a micromirror array comprising a plurality of single axis micromirrors is optically coupled within each stage of routers to switch the wavelength channels between inputs and outputs of each stage.

20. A method as recited in claim 17, wherein each router within the first or second router stage, comprises:

optical waveguides for each wavelength channel;

at least one dispersive element;

a slab waveguide;

a single axis array of micromirrors; and a focusing lens configured to direct wavelengths to and from said single axis array of micromirrors for optically switching wavelength channels between an input and a plurality of outputs, and/or between a plurality of optical inputs and an optical output.

* * * * *